(12) United States Patent
Shcherbinin et al.

(10) Patent No.: US 11,521,011 B2
(45) Date of Patent: Dec. 6, 2022

(54) METHOD AND APPARATUS FOR TRAINING NEURAL NETWORK MODEL FOR ENHANCING IMAGE DETAIL

(71) Applicant: Samsung Electronics Co., Ltd., Suwon-si (KR)

(72) Inventors: Andrei Yurievich Shcherbinin, Moscow (RU); Valery Valerievich Anisimovskiy, Moscow (RU); Pavel Igorevich Biryulin, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/892,782

(22) Filed: Jun. 4, 2020

(65) Prior Publication Data

US 2020/0387750 A1   Dec. 10, 2020

(30) Foreign Application Priority Data

Jun. 6, 2019   (RU) ................................ 2019117713
May 27, 2020   (KR) ........................ 10-2020-0063885

(51) Int. Cl.
*G06K 9/62* (2022.01)
*G06T 5/00* (2006.01)

(52) U.S. Cl.
CPC ............ *G06K 9/6256* (2013.01); *G06T 5/001* (2013.01)

(58) Field of Classification Search
CPC ................. G06K 9/6256; G06T 5/001; G06T 2207/20081; G06T 3/4053;
(Continued)

(56) References Cited

U.S. PATENT DOCUMENTS 5,671,294 A    9/1997 Rogers et al.
9,129,190 B1 *  9/2015 Ranzato ................. G06V 10/82
(Continued)

FOREIGN PATENT DOCUMENTS

CN    109325928 A    2/2019
CN    109426858 A    3/2019
(Continued)

OTHER PUBLICATIONS

T. Van Vu et al, "Fast and efficient image quality enhancement via desubpixel CNN", Kaist, 2018.
(Continued)

*Primary Examiner* — Wesley J Tucker
(74) *Attorney, Agent, or Firm* — Jefferson IP Law, LLP

(57) ABSTRACT

A neural network model training apparatus for enhancing image detail is provided. The apparatus includes a memory and at least one processor configured to obtain a low quality input image patch and a high quality input image patch, obtain a low quality output image patch by inputting the low quality input image patch to a first neural network model, obtain a high quality output image patch by inputting the high quality input image patch to a second neural network model, and train the first neural network model based on a loss function set to reduce a difference between the low quality output image patch and the high quality input image patch, and a difference between the high quality output image patch and the high quality input image patch. The second neural network model is identical to the first neural network model.

15 Claims, 14 Drawing Sheets

(58) Field of Classification Search
CPC ........... G06T 2207/20084; G06T 5/002; G06T 3/4046; G06V 10/764; G06V 10/82; G06N 3/0454; G06N 3/0481; G06N 3/084
See application file for complete search history.

(56) References Cited

U.S. PATENT DOCUMENTS

| | | |
|---|---|---|
| 9,692,939 B2 | 6/2017 | Irani et al. |
| 2013/0170767 A1 | 7/2013 | Choudhury et al. |
| 2014/0270487 A1 | 9/2014 | Park |
| 2016/0239942 A1 | 8/2016 | Usman |
| 2016/0358321 A1 | 12/2016 | Xu et al. |
| 2017/0256033 A1* | 9/2017 | Tuzel ............... G06T 3/4053 |
| 2017/0357879 A1 | 12/2017 | Odaibo et al. |
| 2018/0158240 A1 | 6/2018 | Saito et al. |
| 2018/0338082 A1 | 11/2018 | Baqai et al. |
| 2019/0043178 A1* | 2/2019 | Chen ................. G06T 5/009 |
| 2019/0220746 A1* | 7/2019 | Liu ..................... G06K 9/62 |

FOREIGN PATENT DOCUMENTS

| | | |
|---|---|---|
| CN | 107122826 B | 4/2019 |
| CN | 111767979 A | 10/2020 |
| KR | 10-2014-0111858 A | 9/2014 |
| KR | 10-2019-0062203 A | 6/2019 |
| RU | 2193797 C2 | 11/2002 |

OTHER PUBLICATIONS

Y. S. Chen et al, "Deep Photo Enhancer: Unpaired Learning for Image Enhancement From Photographs With GANs", National Taiwan University, 2018.
A. Ignatov et al, "DSLR-Quality Photos on Mobile Devices with Deep Convolutional Networks", ETH Zurich, Sep. 5, 2017.
B. Lim et al, "Enhanced deep residual networks for single image super-resolution", Seoul National University Winner of NTIRE, 2017.
J. Yu et al, "Wide Activation for Efficient and Accurate Image Super-Resolution", Adobe Research Winner of NTIRE, Dec. 21, 2018.
K. Simoyan et al, "Very deep convolutional networks for large-scale image recognition", Visual Geometry Group, Department of Engineering Science, University of Oxford, Apr. 10, 2015.
Russian Decision To Grant dated Oct. 21, 2019, issued in Russian Application No. 2019117713/08(033874).
International Search Report dated Sep. 3, 2020, issued in International Patent Application No. PCT/KR2020/007399.
Ofir et al.; Multi-scale Processing of Noisy Images using Edge Preservation Losses; arXiv:1803.09420v5 [cs.CV] Mar. 21, 2019; Cornell University Library; XP 81974510A; Mar. 21, 2019; Ithica, NY.
Extended European Search Report dated Aug. 23, 2022; European Appln. No. 20819512.3-1210/3948764 PCT/KR2020007399.

* cited by examiner

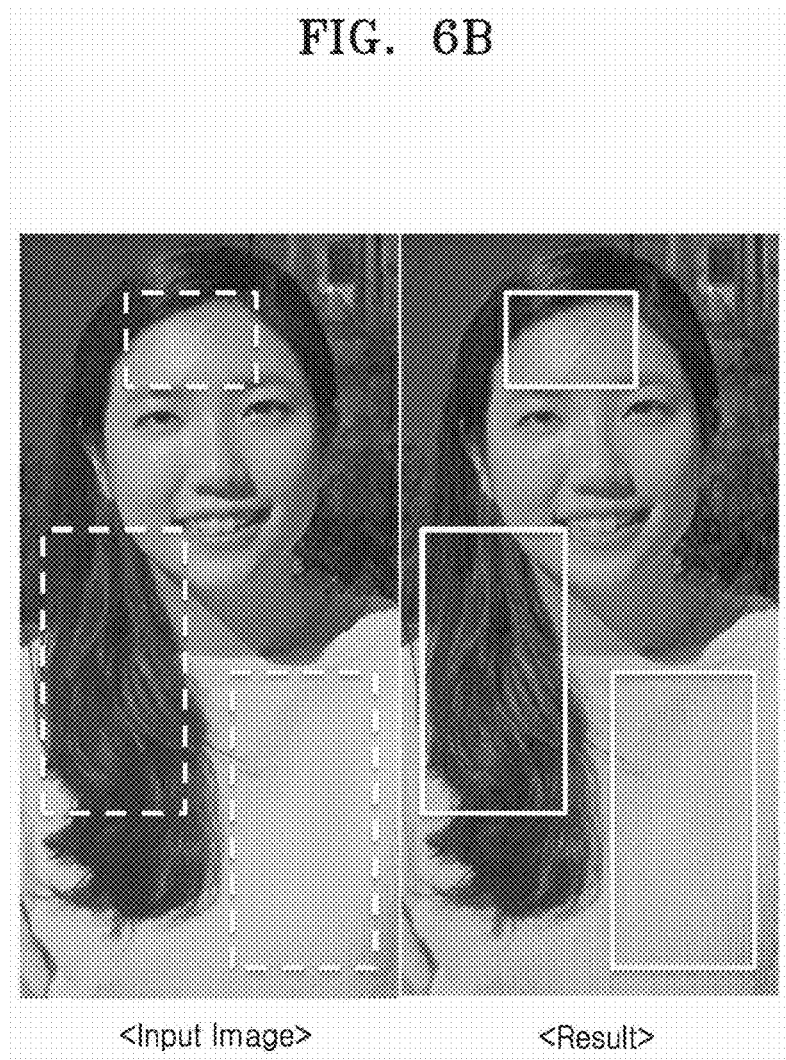

FIG. 7

| Metrics | Input Image | FEQE | DPE | DPED | EDSR | WDSR | Let's Enhance Add texture | Let's Enhance Upscale | Photoshop (Unsharp mask) | Present Disclosure |
|---|---|---|---|---|---|---|---|---|---|---|
| CPBD | 0.58 | 0.59 | 0.15 | 0.40 | 0.69 | 0.69 | 0.69 | 0.53 | 0.59 | 0.65 |
| WaDIQaM-NR | 42.2 | 38.0 | 53.3 | 38.1 | 39.8 | 40.3 | 50.1 | 41.0 | 41.0 | 32.1 |

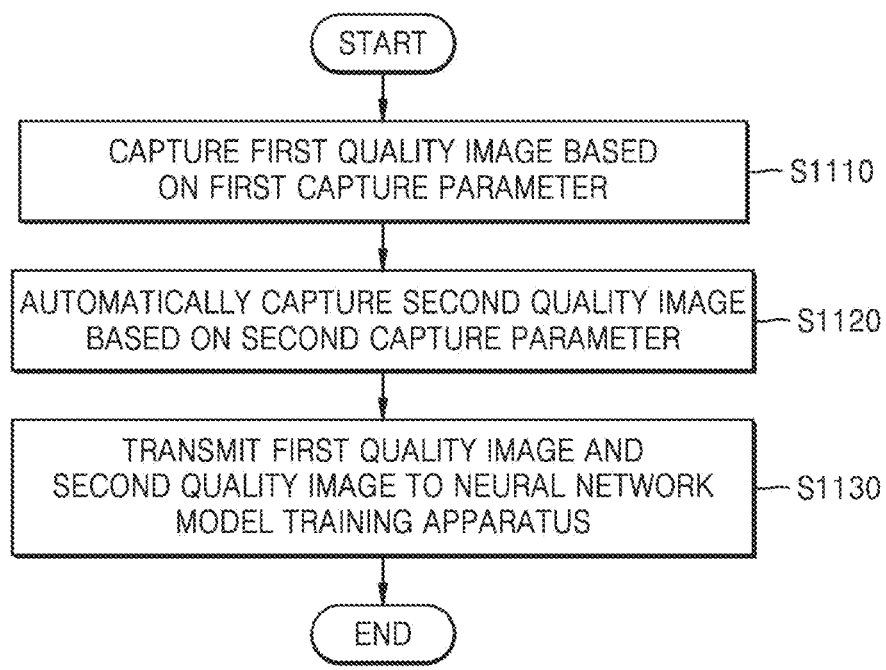

METHOD AND APPARATUS FOR TRAINING NEURAL NETWORK MODEL FOR ENHANCING IMAGE DETAIL

CROSS-REFERENCE TO RELATED APPLICATION(S)

This application is based on and claims priority under 35 U.S.C. § 119(a) of a Russian patent application number 2019117713, filed on Jun. 6, 2019, in the Russian Patent Office, and of a Korean patent application number 10-2020-0063885, filed on May 27, 2020, in the Korean Intellectual Property Office, the disclosure of each of which is incorporated by reference herein in its entirety.

BACKGROUND

1. Field

The disclosure relates to a method and apparatus for training a neural network model for enhancing image detail.

2. Description of Related Art

Currently, most electronic mobile devices, such as smartphones, mobile phones, laptop computers, tablet computers, compact cameras, etc., include cameras for recording images and, owing to their compact size, are often used for taking various photos and videos. However, the quality of images taken with such mobile devices depends on many factors, in particular: a quality of lens systems in mobile device cameras (such mobile devices generally have a low resolution lens due to the use of small-diameter lenses and low quality glass, substantially impairing quality of photos with complex detailed objects or surfaces), a light level (the lower the light level, the more noise in the image), etc.

There are a variety of methods for enhancing quality of images captured by cameras, which are based on a denoising algorithm, a generalized image enhancement algorithm, and a sharpening algorithm. When the denoising algorithm or a denoiser integrated in the camera is used, fine details are inevitably degraded in the image along with denoising. That is, the image is smoothed out. The generalized image enhancement algorithm is aimed at processing the entire image by improving some or several of its main characteristics, for example, at least one of brightness or contrast. However, when processing images, the algorithm does not take into account and, therefore, does not restore, when necessary, fine details in images. The sharpening algorithm is also aimed at processing the entire image, and thus, along with sharpening a blurred edge in the image, the algorithm also adds unwanted artifacts to those parts of the image where edges initially had sufficient sharpness. In addition, this algorithm is also unable to enhance homogeneous parts of images, in particular, to restore structure details of a uniform surface, object, etc. Therefore, such algorithms are not adapted to image content, but rely on a general initial condition for image enhancement.

Convolutional neural network models trained on pairs of an image patch and its downsampled version are disclosed in papers: "Fast and efficient image quality enhancement via desubpixel CNN", T. Van Vu et al., KAIST, 2018 (referred to herein as FEQE), "Enhanced deep residual networks for single image super-resolution", B. Lim et al., Seoul National University, 2017 (referred to herein as EDSR) and "Wide Activation for Efficient and Accurate Image Super-Resolution", J. Yu et al., Adobe Research (referred to herein as WDSR), each of which are incorporated by reference in their entirety. FEQE teaches a method of training on 4× downsampled versions of patches and using residual and desubpixel (converting spatial data blocks to depth) blocks to upsample an input image by a factor of 4. Methods disclosed in EDSR and WDSR involve training on 2× downsampled versions of patches and using the enhanced residual blocks to upsample an input image by a factor of 2. However, training methods and training samples of such convolutional neural networks limit the applicability to restoration of images according to the downsampling algorithms used in training. That is, input images may not be enhanced in the areas that are not recognized by the network models as the areas resulting from the specific downsampling algorithm used in training.

Methods disclosed in papers "Deep Photo Enhancer: Unpaired Learning for Image Enhancement From Photos With GANs", Y. S. Chen et al., National Taiwan University, 2018 (referred to herein as DPE) and "DSLR-Quality Photos on Mobile Devices with Deep Convolutional Networks", A. Ignatov et al., ETH Zurich, 2017 (referred to herein as DPED) use generative adversarial networks (GANs) to enhance images, each of which are incorporated by reference in their entirety. DPE discloses a cyclic GAN model trained on unpaired patches of images. One of the images in the pair has to be a high quality image processed by skilled photographers. However, this method may improve only global image characteristics such as color rendering, brightness, display of shadows, etc., while it is unable to restore fine-grained image details. DPED discloses a GAN model trained on roughly-aligned patch pairs of digital single-lens reflex (DSLR)-quality (taken with a DSLR camera) and mobile phone quality images of the same scene. However, the image enhancement with this method results in over-brightened images. Furthermore, irrelevant noise-like details appear all over the image. That is, the method is unable to correctly restore or redraw fine details in the image. In addition, all of the above methods lack consistency within a large area. That is, even when one or more parts of a long-range object in the image is enhanced, the methods would not correlate these parts to determine whether they belong to the same long-range object so that to enhance it uniformly in a natural way.

Consequently, there is a need for a method of converting an image into an image with redrawn details that have been blurred, over-brightened or otherwise not rendered in an image, which would naturally display the redrawn details in the image, including long-range parts that possess self-similarity property, like human hair.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for training a neural network model for enhancing image detail.

Additional aspects will be set forth in part in the description which follows and, in part, will be apparent from the description, or may be learned by practice of the presented embodiments.

In accordance with an aspect of the disclosure, a neural network model training apparatus for enhancing image detail is provided. The neural network model training apparatus includes a memory configured to store one or more instructions, and at least one processor configured to execute the one or more instructions stored in the memory to obtain a low quality input image patch and a high quality input image patch, obtain a low quality output image patch by inputting the low quality input image patch to a first neural network model, obtain a high quality output image patch by inputting the high quality input image patch to a second neural network model, and train the first neural network model based on a loss function set to reduce a difference between the low quality output image patch and the high quality input image patch, and a difference between the high quality output image patch and the high quality input image patch, wherein the second neural network model is identical to the first neural network model.

In an embodiment of the disclosure, the loss function may include, as terms, a difference between the low quality output image patch and the high quality input image patch and a product of a difference between the low quality output image patch and the low quality input image patch and the difference between the high quality output image patch and the high quality input image patch.

In an embodiment of the disclosure, when the at least one processor trains the first neural network model, a gradient of the loss function for error back-propagation may not include a partial differential of the difference between the low quality output image patch and the low quality input image patch.

In an embodiment of the disclosure, the loss function may include an L1 difference between the low quality output image patch and the high quality input image patch, a product of an L1 difference between the low quality output image patch and the low quality input image patch and an L1 difference between the high quality output image patch and the high quality input image patch, a visual geometry group (VGG) difference between the low quality output image patch and the high quality input image patch, and a product of a VGG difference between the low quality output image patch and the low quality input image patch and a VGG difference between the high quality output image patch and the high quality input image patch.

In an embodiment of the disclosure, the first neural network model may use nested convolution kernels.

In an embodiment of the disclosure, in an encoding part of the first neural network model, for convolution kernels other than a first convolution kernel, each convolution kernel may include each convolution kernel smaller than itself and is included in each convolution kernel larger than itself.

In an embodiment of the disclosure, the low quality input image patch and the high quality input image patch may be captured by a same image capture device, based on different capture parameters.

In an embodiment of the disclosure, the low quality input image patch may be captured with higher sensitivity and shorter exposure time than the high quality input image patch, and the high quality input image patch may be captured with lower sensitivity and longer exposure time than the low quality input image patch.

In accordance with another aspect of the disclosure, a data set collection apparatus for enhancing image detail is provided. The data set collection apparatus includes an image capture module, a memory configured to store one or more instructions, and at least one processor configured to execute the one or more instructions stored in the memory to capture a first quality image through the image capture module, based on a first capture parameter, automatically capture a second quality image through the image capture module based on a second capture parameter different from the first capture parameter upon the first quality image being captured, and transmit the first quality image and the second quality image to a neural network model training apparatus for enhancing image detail.

In an embodiment of the disclosure, the second capture parameter may include lower sensitivity and longer exposure time than those of the first capture parameter.

In an embodiment of the disclosure, the second capture parameter may be set such that brightness of the second quality image is equal to brightness of the first quality image.

In an embodiment of the disclosure, the at least one processor may be further configured to execute the one or more instructions to receive a neural network model from the neural network model training apparatus for enhancing the image detail, capture an image for detail enhancement, and capture an image with redrawn details by inputting the image for detail enhancement to the neural network model.

In an embodiment of the disclosure, the neural network model may use nested convolution kernels.

In accordance with another aspect of the disclosure, a method of a neural network model training for enhancing image detail is provided. The method includes obtaining a low quality input image patch and a high quality input image patch, obtaining a low quality output image patch by inputting the low quality input image patch to a first neural network model, obtaining a high quality output image patch by inputting the high quality input image patch to a second neural network model, and training the first neural network model based on a loss function set to reduce a difference between the low quality output image patch and the high quality input image patch, and a difference between the high quality output image patch and the high quality input image patch, wherein the second neural network model is identical to the first neural network model.

In accordance with another aspect of the disclosure, an operating method of a data set collection apparatus for enhancing image detail is provided. The operating method includes capturing a first quality image based on a first capture parameter, automatically capturing a second quality image based on a second capture parameter different from the first capture parameter upon the first quality image being captured, and transmitting the first quality image and the second quality image to a neural network model training apparatus for enhancing image detail.

In accordance with another aspect of the disclosure, a method of generating a total loss function for training a convolutional neural network to convert an image into an image with redrawn details is provided. The method includes:

taking a pair of images, including a low quality input patch (PL) and a high quality input patch (PH), the low quality input patch (PL) being an image captured with a high international standards organization (ISO) value and a short exposure time, and the high quality input patch (PH) being an image captured with a lower ISO value and a longer exposure time, feeding each of the input patches ($P_L$, $P_H$) to input of each of Siamese convolutional neural subnetworks and processing the input patches ($P_L$, $P_H$) to produce output image patches ($P'_L$, $P'_H$), respectively, wherein an encoding part of each of the Siamese convolutional neural subnetworks uses nested convolution kernels, computing regression difference $D(P'_L, P_H)$, computing modulated retention difference $D(P'_L, P_L)*D(P'_H, P_H)$, generating a total loss function by summing the regression difference and the modulated retention difference for training the convolutional neural network as $D(P'_L, P_H)+D(P'_L, P_L)*D(P'_H, P_H)$, and training the convolutional neural network based on the generated total loss function.

According to an embodiment of the disclosure, a loss function gradient with respect to weights θ of the Siamese convolutional neural subnetwork may be computed as $$\frac{\partial D(P'_L, P_H)}{\partial \theta} + D(P'_L, P_L) \cdot \frac{\partial D(P'_H, P_H)}{\partial \theta} \qquad \text{Equation 1}$$

According to an embodiment of the disclosure, the ISO value and the exposure time of the input patches may be set such that the input patches have identical total brightness.

In accordance with another aspect of the disclosure, a system for converting an image into an image with redrawn details is provided. The system includes:

an image capture device configured to capture an image, a memory configured to store the captured image and a convolutional neural network model for converting an image into an image with redrawn details, the convolutional neural network model being trained based on a total loss function generated according to a method of generating the total loss function for training a convolutional neural network to convert the defined image into the image with the redrawn details, and a processor configured to process the captured image using the stored convolutional neural network model to convert the image to the image with the redrawn details.

In accordance with another aspect of the disclosure, a program stored in a non-transitory computer-readable recording medium, which, when executed by a computer, performs the method is provided.

In accordance with another aspect of the disclosure, a non-transitory computer-readable recording medium having recorded thereon a program for performing, by a computer, the method is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6B illustrates a pair of input images and an image obtained by processing the input images, according to an embodiment of the disclosure;

FIG. 7 is a table comparing the results of quality assessment of images processed by the method of the related art according to an embodiment of the disclosure;

FIG. 11 is a flowchart schematically illustrating a flow of a method of operating a data set collection apparatus for enhancing image detail, according to an embodiment of the disclosure.

Throughout the drawings, it should be noted that like reference numbers are used to depict the same or similar elements, features, and structures.

DETAILED DESCRIPTION

Figure 1:
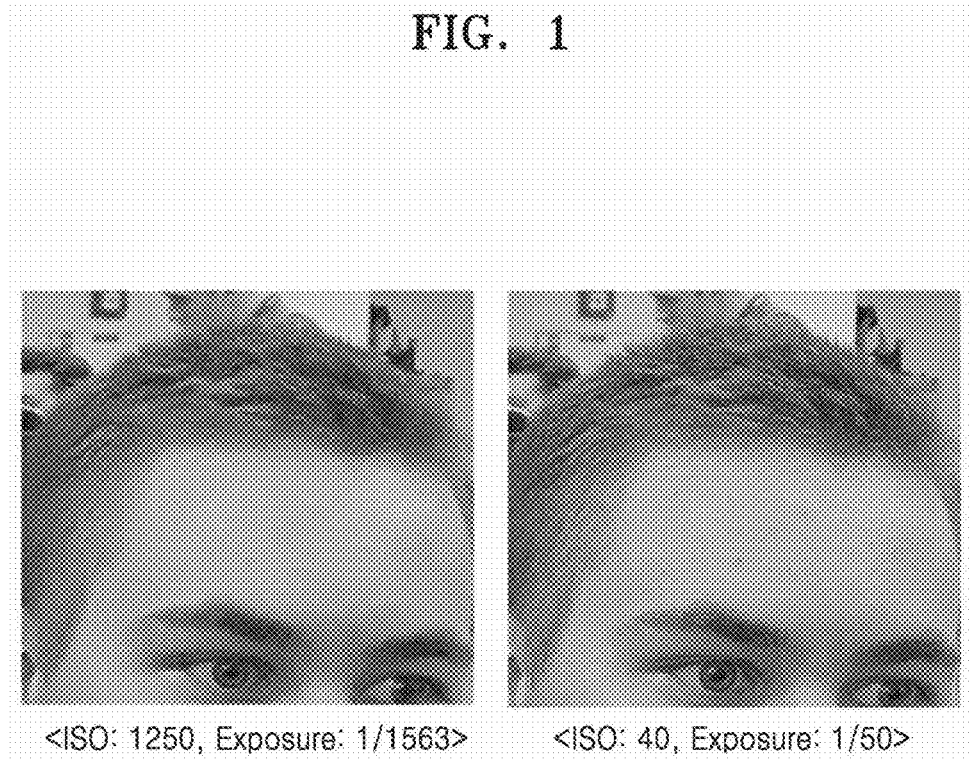
FIG. 1 illustrates an example of a pair of images with different quality settings, captured for training a convolutional neural network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

In the drawings, elements having substantially the same functional configuration are assigned the same reference numerals and symbols as possible, even when they are illustrated on different drawings. For convenience of description, when necessary, the apparatus and the method will be described together. The respective operations of the disclosure need not necessarily be performed in the stated order and may be performed in parallel, optionally, or individually.

The disclosure provides the use of a convolutional neural network to convert an input image into an image with redrawn details, i.e., to construct an image with a higher level of detail than an input image in which details are blurred or smoothed out. In other words, the convolutional neural network may be trained to convert a low quality image patch into a high quality image patch without losing information content of the patch. In order to train the convolutional neural network, pairs of images each including a low quality patch and a high quality patch may be fed to its input. Each of the patches may be processed by respective Siamese neural convolutional subnetworks, and a total loss function may include differences between input patches and output patches. In addition, the Siamese neural convolutional subnetworks may use nested convolution kernels to take into account self-similarity properties in the images and reduce overfitting, which ensure the use of a small amount of weights of the convolutional neural network, such that the storage capacity required to store the model of the disclosure is reduced.

Pairs of images for training the neural network may be captured using any suitable device including a camera and configured to capture images with different quality settings, e.g., a mobile device with an application for capturing such images installed thereon. Each pair of input patches may be matched. That is, both patches of the same pair show the same scene at, or almost at, the same instant. However, the patches may be captured with different settings (e.g., exposure, ISO). Image patches $P_L$ and $P_H$ (low quality patch $P_L$ and high quality patch $P_H$) of one pair may be separately processed by respective Siamese convolutional neural subnetworks to produce output patches $P'_L$ and $P'_H$. The output patch $P'_L$ and the input patch $P_H$ may be used to form regression difference $D(P'_L, P_H)$, which is a component responsible for enhancement of the low quality patch. The output patches $P'_L$ and $P'_H$ and the input patches $P_L$ and $P_H$ may be used to form modulated retention difference $D(P'_L, P_L)*D(P'_H, P_H)$, which is a component responsible for retaining quality of the high quality patch. The two differences may be summed up to form a total loss function which is used to train the entire convolutional neural network. Because the applied error back-propagation method does not take into account $D(P'_L, P_L)$ (this difference is not minimized), the loss function gradient with respect to weights θ of the Siamese neural convolutional subnetwork may be calculated as:

$$\frac{\partial D(P'_L, P_H)}{\partial \theta} + D(P'_L, P_L) \cdot \frac{\partial D(P'_H, P_H)}{\partial \theta} \qquad \text{Equation 2}$$

The above description will be described below in more detail.

FIG. 1 illustrates an example of a pair of images captured with a mobile device having an application for capturing images with different quality settings installed thereon according to an embodiment of the disclosure.

Referring to FIG. 1, the images show the top of a person's head, including the person's hair. The application may set international standards organization (ISO) parameters required when each image is captured, and the exposure and aperture parameters may be automatically adjusted by the application so that the total brightness of the captured pair of images is the same. Optionally, these parameters may be set manually at any suitable device configured to capture images. According to an embodiment of the disclosure, a low quality image refers to an image captured with high ISO and short exposure time, and a high quality image refers to an image captured with low ISO and long exposure time, as compared to the same parameters applied to capture the low quality image.

In particular, FIG. 1 illustrates a pair of images: a low quality image with ISO of 1250 and exposure time of 1/1563, and a high quality image with ISO of 40 and exposure time of 1/50. FIG. 1 clearly illustrates that a human hair structure in a second image is rendered much better than that in a first image.

According to an embodiment of the disclosure, end users may receive a pre-trained convolutional neural network model to convert an image into an image with redrawn details (e.g., to form a high quality image based on a low quality image). According to an alternative embodiment of the disclosure, a method is provided in which the end user independently collects a database for training a convolutional neural network (i.e., takes a series of training pairs of images according to the user interests), the database collected by the end user is loaded into cloud storage, the convolutional neural network is trained on the end user-collected database, and the convolutional neural network model trained on the database is provided to the end user.

Thus, according to an alternative embodiment of the disclosure, the convolutional neural network model may be adapted to user data.

The method of training the convolutional neural network to convert an image into an image with redrawn details will be further described in more detail with reference to FIG. 2.

Figure 2:
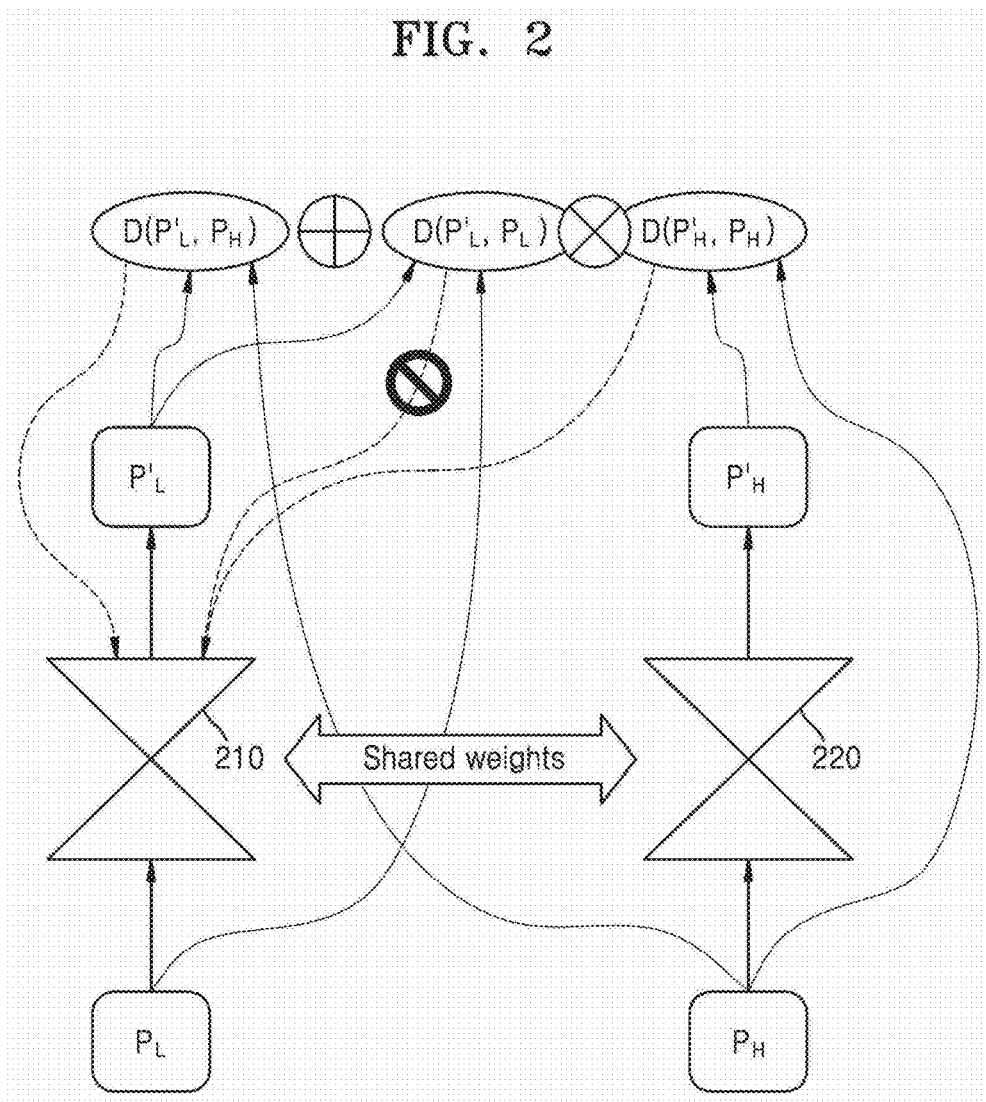
FIG. 2 is a flowchart of a method of training a convolutional neural network so as to convert an image into an image with redrawn details, according to an embodiment of the disclosure.

FIG. 2 is a flowchart of a method of training a convolutional neural network so as to convert an image into an image with redrawn details, according to an embodiment of the disclosure.

Referring to FIG. 2, to train the convolutional neural network, a pair of images, i.e., low quality patch $P_L$ and high quality patch $P_H$, may be obtained as described above. Image data may be processed separately by Siamese convolutional neural subnetworks 210 and 220 to form output patches $P'_L$ and $P'_H$, and the Siamese convolutional neural subnetworks have the same weights for uniform processing of the two images of the pair. As a result of processing by the Siamese convolutional neural subnetworks 210 and 220, details of the input patches are redrawn. During the processing, the Siamese convolutional neural subnetworks 210 and 220 increase the level of detail of the input patch $P_L$ for formation of the output patch $P'_L$, without substantially changing the input patch $P_H$ when the output patch $P'_H$ is produced.

Next, respective differences are calculated, which are used to compute the total loss function for training the convolutional neural network to convert an image into an image with redrawn details. Regression difference may be calculated based on the output patch $P'L$ and the input patch $P_H$ as $D(P'_L, P_H)$ by any method of the related art, for example, as an absolute loss value (also known as L1-norm $$\sum_i |p'_i - p_i|)$$

or as a quadratic loss function (also known as L2-norm $$\sum_i (p'_i - p_i)^2).$$

$p_i$ represents elements of patch $P_H$, and $\dot{p}_i$ represents elements of patch $P'_L$, respectively. In addition, the difference D may be calculated as perceptual difference $$D(P'_L, P_H) = \sum_{i,j,k} |\phi(P'_L) - \Phi(P_H)|.$$

$\phi \to x_{i,j,k}$ (i.e., the function resulting from training the model to recognize image classes, built by the Visual Geometry Group (VGG)). In addition to the regression difference, a modulated retention difference is generated based on both the output patches $P'_L$, and $P'_H$, and the input patches $P_L$ and $P_H$ as $D(P'_L, P_L)*D(P'_H, P_H)$. The difference D may be calculated similarly by any of the methods of the related art described above.

The differences (i.e., the regression difference and the modulated retention difference) are summed up to obtain the total loss function $D(P'_L, P_H)+D(P'_L, P_L)*D(P'_H, P_H)$, which is used to train the entire convolutional neural network. In particular, the total loss function may be calculated as:

$$\mathcal{L} = \sum_{l=1}^{2} \frac{1}{N_l} \sum_{i,j,k} (|P'^{(l)}_L - P^{(l)}_H| + |P'^{(l)}_L - P^{(l)}_L| \cdot |P'^{(l)}_H - P^{(l)}_H|)(i, j, k) + $$
$$\frac{1}{N_f} \sum_{i,j,k} (|\varphi(P'_L) - \varphi(P_H)| + $$
$$w|\varphi(P'_L) - \varphi(P_L)| \cdot |\varphi(P'_H) - \varphi(P_H)|)(i, j, k)$$

Equation 3 where φ is 4-th layer transform of VGG-19 neural network (see Simonyan K., Zisserman A., "Very deep convolutional networks for large-scale image recognition", 2014, which is incorporated by reference herein in its entirety), l is image pyramid level index, $N_l$ is the number of pixels on the l-th level of image pyramid, $N_f$ is the number of VGG 4-th layer features, and w is an empirically chosen positive parameter. i and j are spatial coordinates of each tensor, and k is a color plane of a pixel in a front term and a VGG picture index at a rear term. In particular, according to an embodiment, the parameter w=0.001 based on many experiments. The φ transform may be set as follows: a patch image with dimension W×H×3 (W represents width, H represents height, and 3 represents three RGB color channels) is fed to input of a trained VGG-19 neural network, and the transform output is the output of the VGG-19 4-th layer (see Table 1 in the above paper, the rightmost column is configuration E, and the output of the top layer is marked in bold as conv3-512), which is a tensor with dimension W/8×H/8×512.

Furthermore, as described above, because the applied error back-propagation method does not take into account $D(P'_L, P_L)$, the loss function gradient with respect to the weights θ of the Siamese neural convolutional subnetwork, which processes patch $P_L$, is calculated as:

$$\frac{\partial D(p'_L, p_H)}{\partial \theta} + D(p'_L, p_L) \cdot \frac{\partial D(p'_H, p_H)}{\partial \theta}$$

Equation 4 where θ is weights of the Siamese convolutional neural subnetwork.

In particular, according to the rules of differentiation, the loss function gradient with respect to the weights of the subnetwork should look as:

$$\frac{\partial D(p'_L, p_H)}{\partial \theta} + D(p'_L, p_L) \cdot \frac{\partial D(p'_H, p_H)}{\partial \theta} + $$
$$D(p'_H, p_H) \cdot \frac{\partial D(p'_L, p_L)}{\partial \theta}$$

Equation 5

However, according to the disclosure, the last term including the differential $D(P'_L, P_L)$ is not taken into account, as mentioned above. Thus, the error propagation is "blocked" from the difference $D(P'_L, P_L)$. This provides selective enhancement of poor quality image areas even without matching paired high-quality areas by restoring or redrawing details of the image. In other words, by taking into account the modulated retention difference, the convolutional neural network may be trained to take into account the most "valuable" areas in high quality images based on how much similar areas in the low quality images have undergone changes at output of processing by the Siamese convolutional neural subnetwork (when a low quality image area has not undergone changes, a similar area in the high quality image is considered less valuable in training, and vice versa). Therefore, the convolutional neural network does not use a high quality image as a reference image and learns a method of recognizing and enhancing low quality areas in this image.

Figure 3:
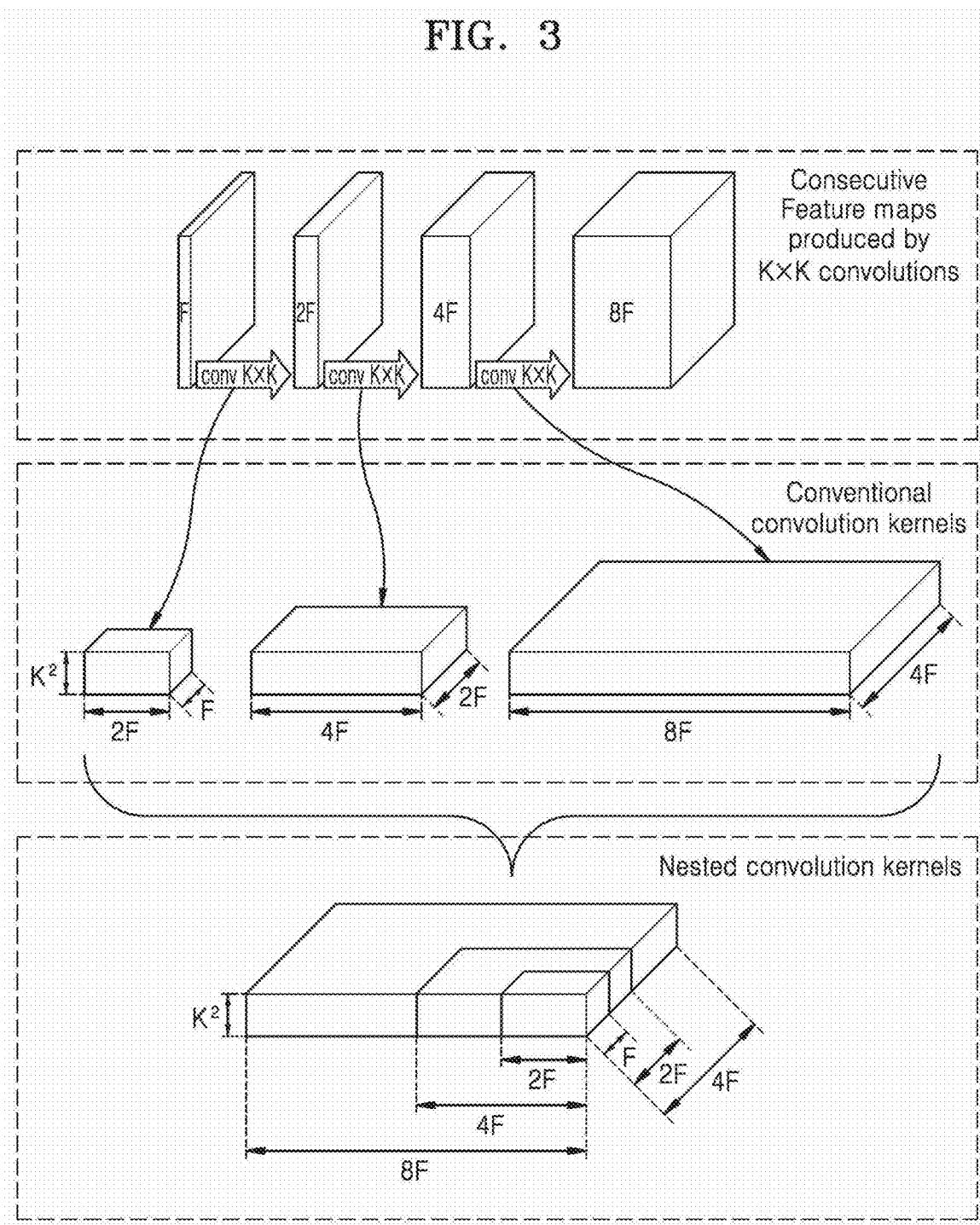
FIG. 3 illustrates a structure of nested convolution kernels used to train a convolutional neural network, according to an embodiment of the disclosure.

FIG. 3 illustrates a structure of nested convolution kernels used in an encoding part of Siamese convolutional neural subnetworks to train the convolutional neural network to convert an image into an image with redrawn details according to an embodiment of the disclosure.

In models of convolutional neural networks of the related art, the convolution kernels used in training are updated independently of each other, which often leads to a large model capacity (many network weights). This is the main cause of overfitting of convolutional neural networks, which in turn impairs the efficiency of using the convolutional neural network model when unfamiliar databases are processed. The embodiment of the disclosure assumes the use of a single pool of convolution kernels, i.e., nested convolution kernels, which allows increasing the receptive field without increase in the amount of weights used.

The single pool of convolution kernel weights has the largest convolution dimension used in training the convolutional neural network. Each convolution (except for the first convolution, which is separate as it works directly with original red, green blue (RGB) data of the input patch) is assigned respective subsets of kernel weights. Referring to FIG. 3, an example is illustrated in which three consecutive K×K convolutions successively convert a feature map with dimension H×W×F into feature maps with dimensions H×W×2F, H×W×4F and H×W×8F. The largest convolution in this example uses the kernel with dimension K×K×8F×4F (K×K merged into $K^2$ in the figure for clarity). According to the embodiment of the disclosure, in this example, the largest convolution is distributed to three convolutions: the first convolution receives K×K×2F×F subtensors from the common single pool, the second convolution receives K×K× 4F×2F subtensors, and the third convolution receives the whole K×K×8F×4F tensors. During training, the convolution kernel weights are updated according to this distribution. That is, the updating of the pool of weights always takes into account that part of the larger convolution weights always coincides with the smaller convolution weights.

This application of nested convolutions may substantially enlarge the receptive field of the convolutional neural network without an increase in the amount of the convolutional neural network weights, such that larger visual context for image processing is provided without the risk of overfitting. In addition, this approach provides consistency of fine details in the image, including long-range details possessing the self-similarity property, e.g., human hair, because convolutions of all levels have the same smaller convolution weights, which are seeking for and leveraging fractal image self-similarity. Therefore, the convolutional neural network model of the disclosure makes it possible to apply the same weights to feature maps with different dimensions, thereby recognizing self-similarity features of the objects present in processed images.

Figure 4:
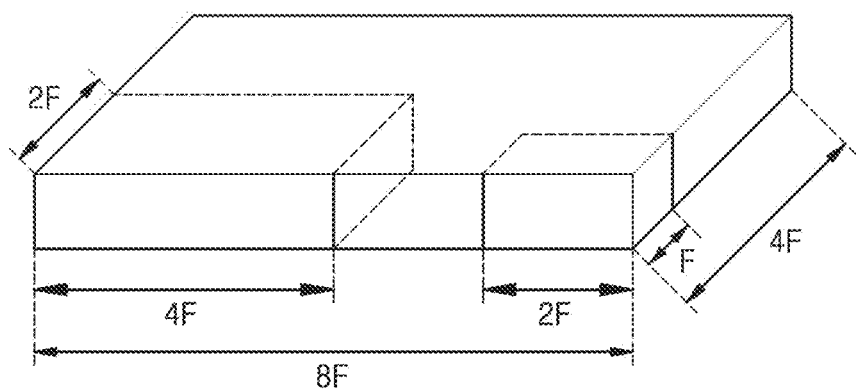
FIG. 4 illustrates a structure of convolution kernels used to train a convolutional neural network, according to an embodiment of the disclosure.

FIG. 4 illustrates a structure of convolution kernels used to train a convolutional neural network, according to an embodiment of the disclosure.

Referring to FIG. 4, in an alternative embodiment of the disclosure, a single pool of weights may be used, in which the convolution kernels are not nested but distributed over the largest convolution. Even in this alternative embodiment of the disclosure, the amount of the convolutional neural network weights also decreases. However, this approach does not ensure the consistency of fine details in the image, i.e., the detail integrity in the produced high quality image is worsened, as compared to the image produced according to the previous embodiment of the disclosure.

Figure 5A:
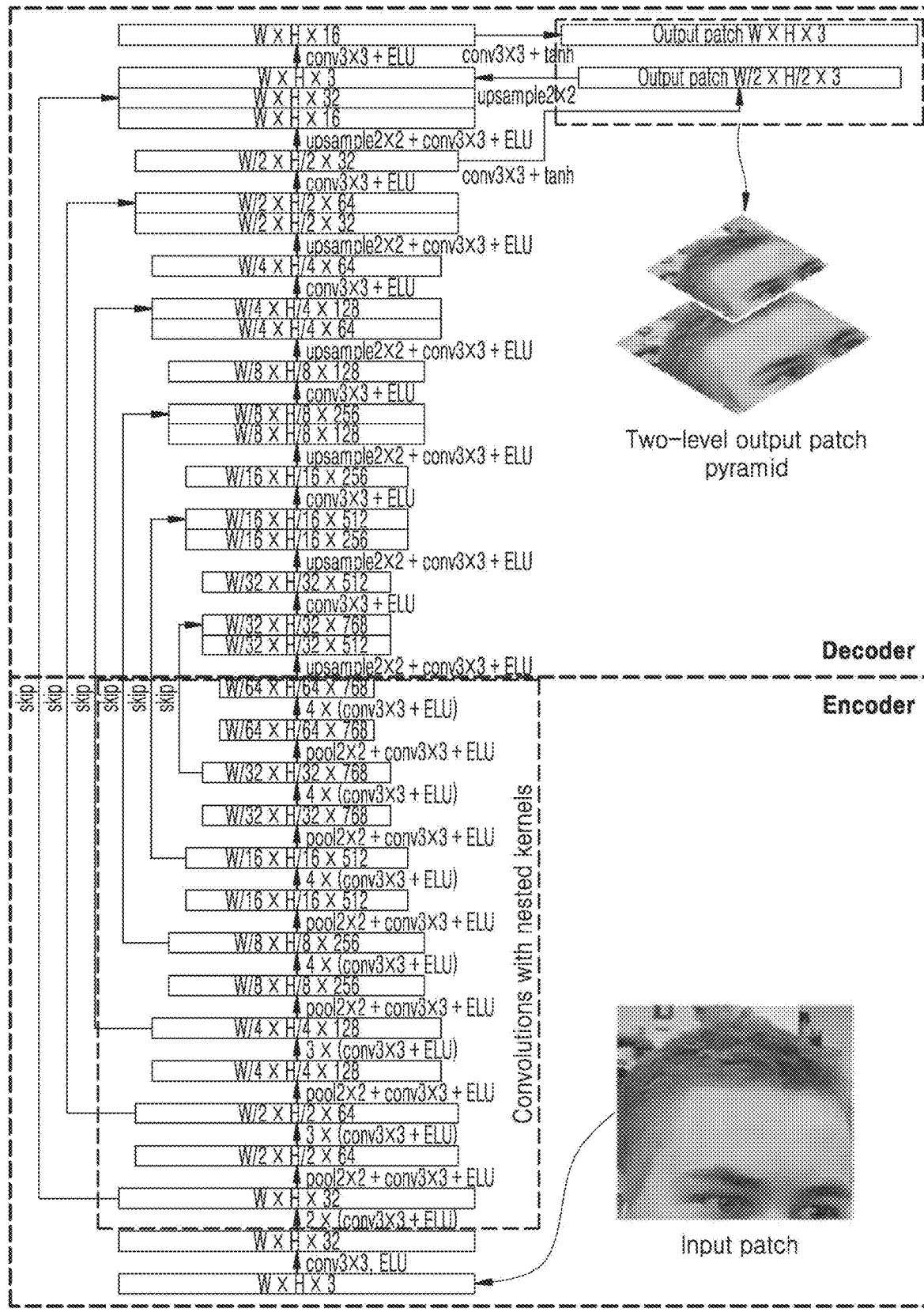
FIG. 5A is a detailed schematic diagram of input image processing using a Siamese convolutional neural subnetwork, according to an embodiment of the disclosure.

FIG. 5A is a detailed diagram of the processing using a Siamese convolutional neural subnetwork, according to an embodiment of the disclosure.

The subnetwork may have a U-Net architecture (compressive encoder and decoder followed). Referring to FIG. 5A, each of the patches (low quality patch and high quality patch) arrive independently at the input of its own Siamese convolutional neural subnetwork. The output of the Siamese convolutional neural subnetwork is 2-level pyramid of output patches. Optionally, a pyramid of images with a large number of levels may be produced, but it has been experimentally found that a larger image pyramid may not significantly enhance the quality. The compressive encoder of the subnetwork uses convolutions with nested kernels as described above (except for the first convolution applied). As clearly illustrated in FIG. 5A, the input patch ($P_L$ or $P_H$) fed to input of the subnetwork has W×H×3 dimension and the patch is processed within the subnetwork (3×3 convolution and exponential linear unit (ELU) activation function) to produce an array with a depth of 32 (dimension W×H× 32). All the convolutions used later for processing within the subnetwork may be nested convolutions as described above. In particular, further processing in the subnetwork produces an array with similar dimension (3×3 convolution and ELU activation function are applied twice).

Then, 2×2 subsampling (pooling), 3×3 convolution, and ELU activation function are applied to produce an array in which width and height are halved and depth (number of feature maps) becomes 64 (W/2×H/2×64). Then, 3×3 convolution and ELU activation function are applied three times to produce an array in which width, height, and depth remain unchanged. Then, 2×2 subsampling, 3×3 convolution, and ELU activation function are applied to produce an array in which width and height are halved again and depth becomes 128 (W/4×H/4×128). Then, 3×3 convolution and ELU activation function are again applied three times to produce an array in which width, height, and depth remain unchanged. Then, 2×2 subsampling, 3×3 convolution, and the ELU activation function are applied again to produce an array in which width and height are halved again and depth becomes 256 (W/8×H/8×256). Then, 3×3 convolution and ELU activation function are applied four times to produce an array in which width, height, and depth remain unchanged. Then, 2×2 subsampling, 3×3 convolution, and ELU activation function are applied again to produce an array in which width and height are halved again and depth becomes 512 (W/16×H/16×512). Then, 3×3 convolution and ELU activation function are applied again four times to produce an array in which width, height, and depth remain unchanged. Then, 2×2 subsampling, 3×3 convolution, and ELU activation function are applied again to produce an array in which width and height are halved again and depth becomes 768 (W/32×H/32×768). Then, 3×3 convolution and ELU activation function are applied again four times to produce an array in which width, height, and depth remain unchanged. After 2×2 subsampling, 3×3 convolution, and ELU activation function are applied, an array in which width and height are halved again and depth remains unchanged is obtained (W/64×H/64×768). Then, 3×3 convolution and ELU activation function are applied again four times to produce an array in which width, height, and depth remain unchanged, and processing in the encoding part of the subnetwork is terminated. Therefore, upon processing in the compressive encoding part of the subnetwork, image height and width are reduced (by 64× in total), and the number of feature maps increases up to 768.

Then, the image size is increased again in the decoder. In addition, as clearly seen in FIG. 5A, the Siamese convolutional neural subnetwork of the disclosure uses skip connections (transfer links), which connect the subnetwork layers that are not adjacent to each other, to preserve details of the original input patch by transmitting the respective arrays from the compressive encoding part to the decoding part and concatenating with an array having matching height and width. For example, the first skip connection (marked as "skip" in FIG. 5A) transmits output of the second layer, i.e., the array with dimension W×H×32 to the decoding part and concatenates it with the output of the next layer having dimension W×H×16. The upsampling operation used in the decoding part is marked as "upsample" in FIG. 5A. In particular, when the processing in the decoding part of the subnetwork applies 2×2 upsampling, 3×3 convolution, and ELU activation function, the result is an array with dimension W/32×H/32×512. In addition, as illustrated in FIG. 5A, an array with matching dimension is transmitted to this part through the transmission operation, and the array is concatenated with this part to obtain an array with dimension W/32×H/32×1024. Then, 3×3 convolution and ELU activation function are applied to produce a W/32×H/32×512 array. Then, similarly to the encoding part, 2×2 upsampling, 3×3 convolution, and ELU activation function are applied alternately, followed by transmission of an array with matching dimension, 3×3 convolution, and ELU activation function. After obtaining the W/2×H/2×32 array as a result of 3×3 convolution and ELU activation function, as an alternative to the application of 2×2 upsampling, 3×3 convolution, and ELU activation function, 3×3 convolution and tanh activation function are applied to produce a W/2×H/2×3 output patch (second level of the output patch pyramid). 2×2 upsampling is applied to this patch, resulting in a W×H×3 array, which is concatenated with the W×H×32 array transmitted from the encoding part and the W×H×16 output of the next convolution of the decoding part. Then, 3×3 convolution and ELU activation function are applied to the concatenation result to produce a W×H×16 array, to which 3×3 convolution and tanh activation function are applied to produce W×H×3 output patch (first level of the pyramid of output patches). Due to the use of nested convolution kernels, the Siamese convolutional neural subnetwork includes a relatively small amount of trainable weights (17.5 M). The same architecture without the use of nested convolution kernels includes 77.4 M trainable weights (4.4× more), but has the same receptive field.

Figure 5B:
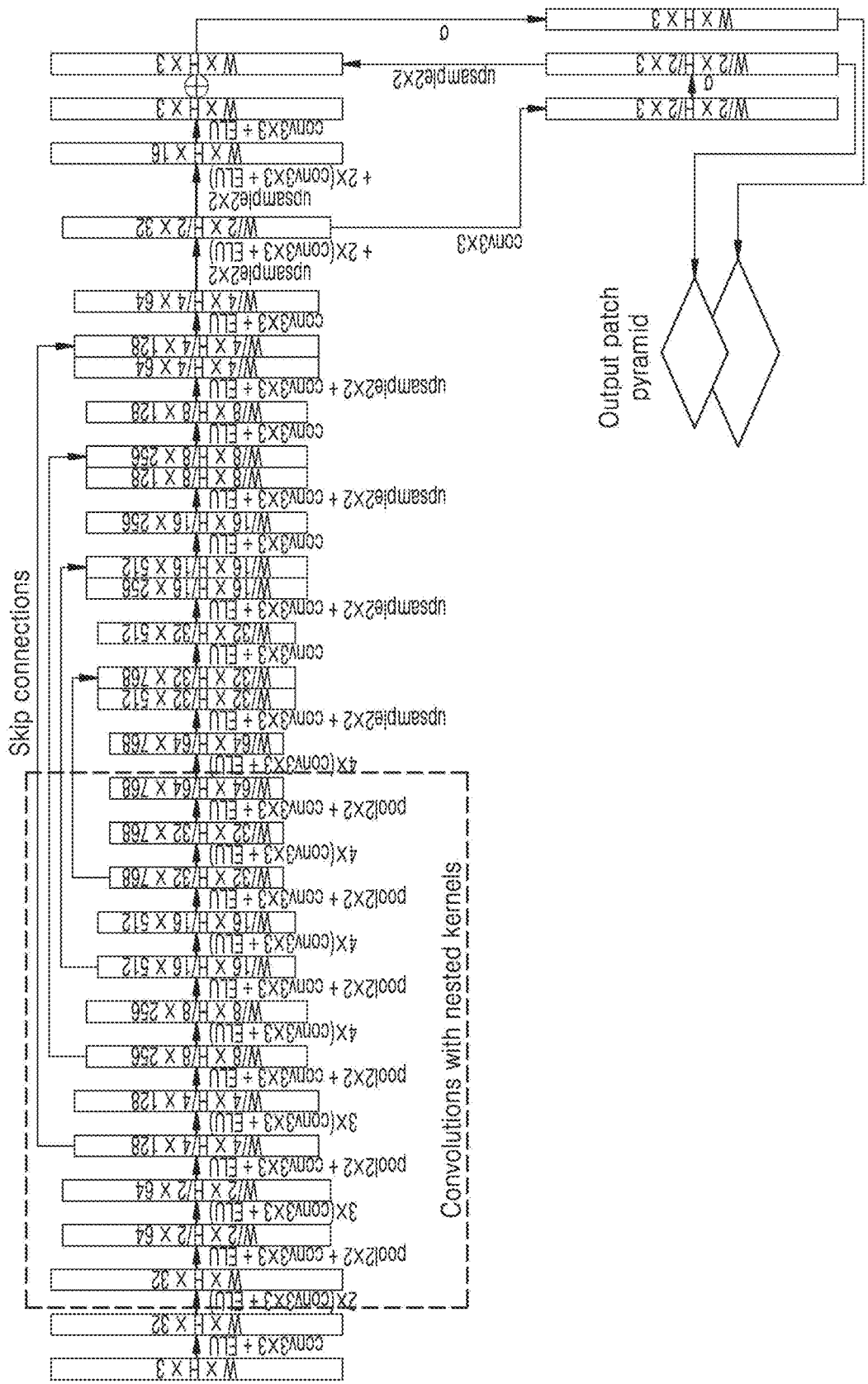
FIG. 5B is a detailed schematic diagram of input image processing using a Siamese convolutional neural subnetwork, according to an embodiment of the disclosure.
Figure 6A:
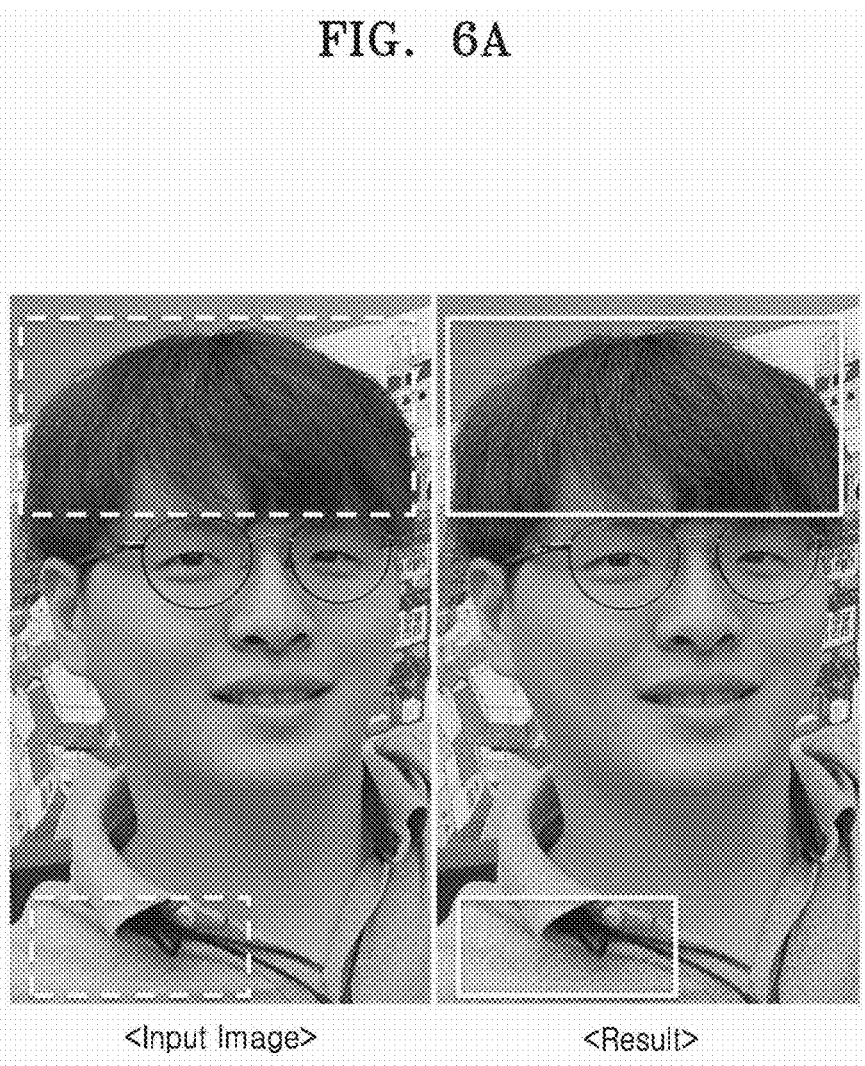
FIG. 6A illustrates a pair of input images and an image obtained by processing the input images, according to an embodiment of the disclosure.
Figure 6C:
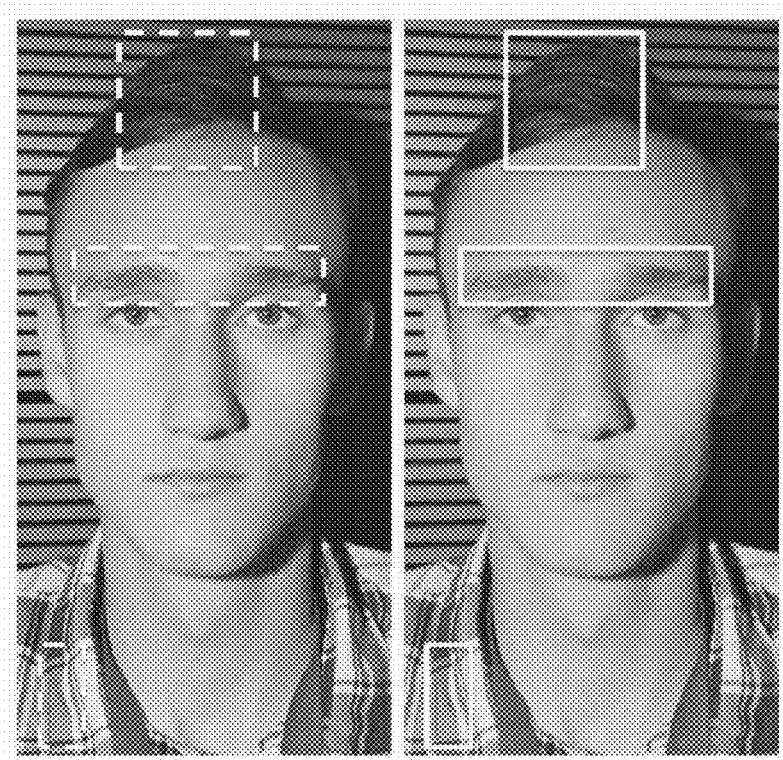
FIG. 6C illustrates a pair of input images and an image obtained by processing the input images, according to an embodiment of the disclosure.
Figure 6D:
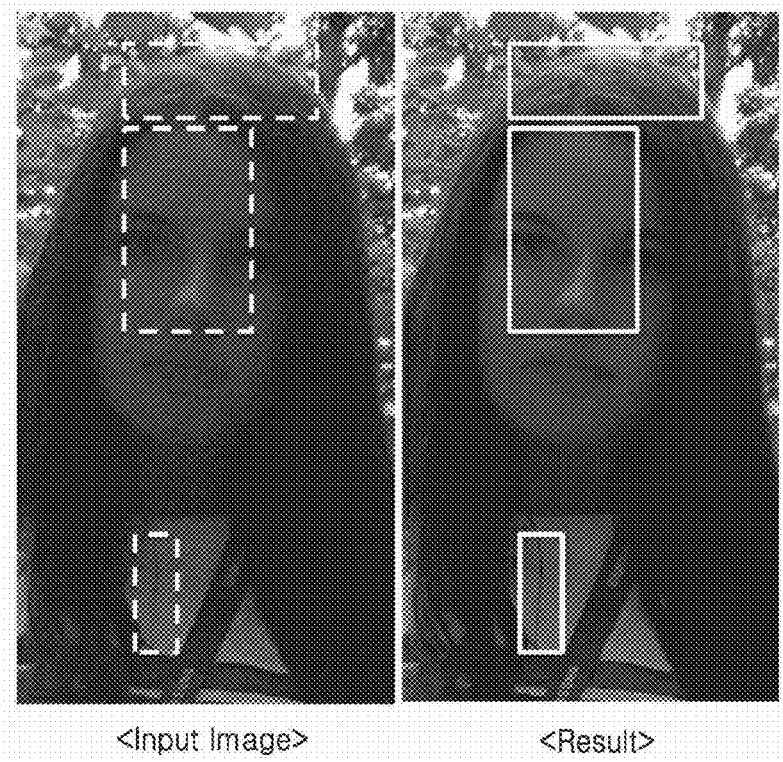
FIG. 6D illustrates a pair of input images and an image obtained by processing the input images, according to an embodiment of the disclosure.

FIG. 5B is a detailed diagram of processing using a Siamese convolutional neural subnetwork, according to another embodiment of the disclosure.

Referring to FIG. 5B, ⊕ represents element-wise sum, σ represents sigmoid activation function. Because the others are similar to those in FIG. 5A, detailed descriptions thereof will be omitted.

FIGS. 6A, 6B, 6C, and 6D illustrate pairs of an input image and an image produced by processing the input image according to the various embodiments of the disclosure.

Referring to FIGS. 6A, 6B, 6C, and 6D illustrate the result of converting an image into an image with redrawn details by using a convolutional neural network trained according to one or more methods of the disclosure. In each of FIGS. 6A, 6B, 6C, and 6D, the input image (e.g., low quality image) is illustrated on the left side and the result based on the use of the convolutional neural network trained according to the method of the disclosure (in particular, high quality image) is illustrated on the right side. In FIGS. 6A, 6B, 6C, and 6D, rectangular regions highlight the areas clearly showing the enhancement resulting from the use of the convolutional neural network of the disclosure, in particular, more clearly drawn hair structure, more clearly drawn structure of clothing/fabric, more clear skin structure in a darkened image, etc., and all these more clear details are drawn in a way that appears natural.

A system for converting an image into an image with redrawn details, according to an embodiment of the disclosure, may include an image capture device configured to capture an image to be processed. The image capture device may be further configured to capture images with different quality settings to collect a personal training set, as described above. The system may further include a memory configured to store a convolutional neural network model for converting an image into an image with redrawn details, trained according to the disclosure, and the captured images and the personal training set collected using the image capture device. In addition, the system may include a processing device configured to process the captured images using the stored convolutional neural network model for converting an image into an image with redrawn details. In addition, the memory may be configured to store a result of processing the captured images.

Quality of images produced according to the disclosure may be assessed using Cumulative Probability of Blur Detection (CPBD) and Weighted Average Deep Image Quality Measure for No-Reference (WaDIQaM-NR).

FIG. 7 is a table comparing the results of the method trained according to an embodiment of the disclosure and the methods of the related art described in the background section, and the widely applicable "Let's Enhance" (i.e., algorithm for adding texture and algorithm for enhancing resolution) and "Photoshop" (i.e., unsharp mask filter).

Referring to FIG. 7, because CPBD image quality assessment metrics assesses only image clarity/blurriness, the image quality is better as the score is higher. WaDIQaM-NR is a trained non-reference image quality metrics assessing the overall image. As clearly seen in the table of FIG. 7, the average quality score of images produced according to the disclosure, obtained by the CPBD metric, is 0.65, which is commensurate with the similar score obtained for the methods disclosed in EDSR and WDSR. The average score obtained using the WaDIQaM-NR metric is 32.1, which is the best result among all the analyzed methods.

Figure 8:
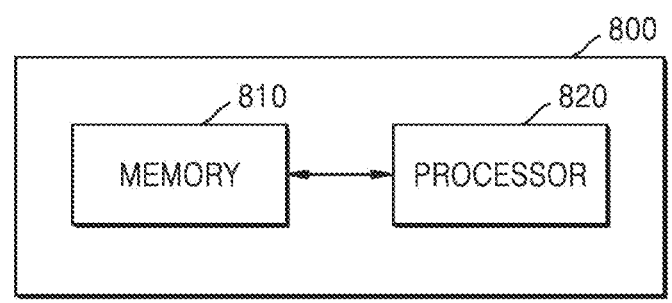
FIG. 8 is a block diagram schematically illustrating a configuration of a neural network model training apparatus for enhancing image detail, according to an embodiment of the disclosure.

FIG. 8 is a block diagram schematically illustrating a configuration of a neural network model training apparatus for enhancing image detail, according to an embodiment of the disclosure.

Referring to FIG. 8, a neural network model training apparatus 800 according to an embodiment of the disclosure may include a memory 810 configured to store one or more instructions and a processor 820 configured to execute the one or more instructions stored in the memory 810. The memory 810 may be a single memory or a plurality of memories. The processor 820 may be a single processor or a plurality of processors. The operation of the neural network model training apparatus 800, which is performed by the processor 820, is the same as the method of training the neural network model described above and will be described again with reference to FIG. 10. The neural network model training apparatus 800 may be a mobile device.

Figure 9:
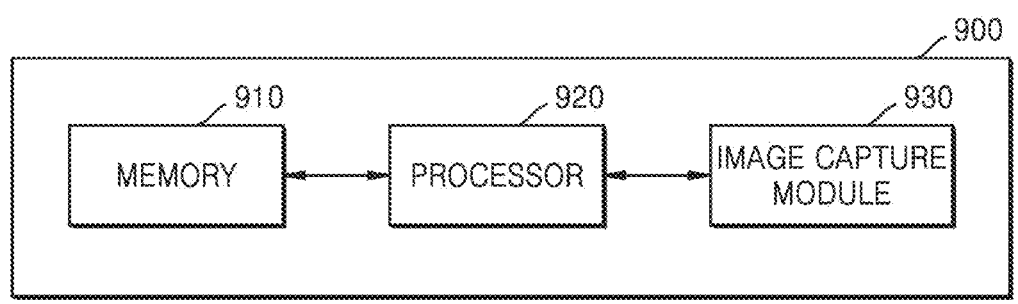
FIG. 9 is a block diagram schematically illustrating a configuration of a data set collection apparatus for enhancing image detail, according to an embodiment of the disclosure.

FIG. 9 is a block diagram schematically illustrating a configuration of a data set collection apparatus for enhancing image detail, according to an embodiment of the disclosure.

Referring to FIG. 9, a data set collection apparatus 900 according to an embodiment of the disclosure may include a memory 910 configured to store one or more instructions, a processor 920 configured to execute the one or more instructions stored in the memory 910, and an image capture module 930. The memory 910 may be a single memory or a plurality of memories. The processor 920 may be a single processor or a plurality of processors. The operation of the data set collection apparatus 900, which is performed by the processor 920, is the same as the data set collection method described above and will be described again with reference to FIG. 11. The data set collection apparatus 900 may be a mobile device. The data set collection apparatus 900 and the neural network model training apparatus 800 may be integrated as one apparatus.

Figure 10:
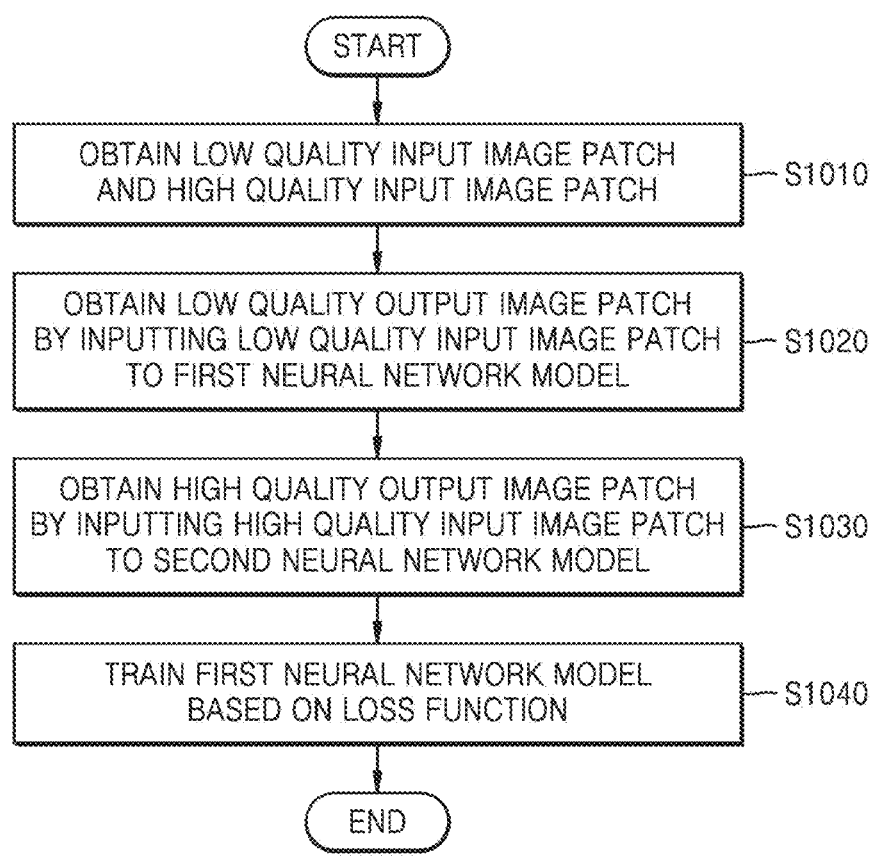
FIG. 10 is a flowchart schematically illustrating a flow of a method of operating a neural network model training apparatus for enhancing image detail, according to an embodiment of the disclosure.

FIG. 10 is a flowchart schematically illustrating a flow of a method of operating a neural network model training apparatus for enhancing image detail, according to an embodiment of the disclosure.

Referring to FIG. 10, in operation S1010, the processor 820 of the neural network model training apparatus 800 may obtain a low quality input image patch $P_L$ and a high quality input image patch $P_H$. The low quality input image patch $P_L$ and the high quality input image patch $P_H$ may be obtained from the data set collection apparatus 900. In operation S1020, the processor 820 may obtain a low quality output image patch $P'_L$ by inputting the low quality input image patch $P_L$ to a first neural network model. In operation S1030, the processor 820 may obtain a high quality output image patch $P'_H$ by inputting the high quality input image patch $P_H$ to a second neural network model. As described above, operation S1020 and operation S1030 need not be performed in order. In operation S1040, the processor 820 may train the first neural network model based on a loss function set to reduce a difference $D(P'_L, P_H)$ between the low quality output image patch $P'_L$ and the high quality input image patch $P_H$ and a difference $D(P'_H, P_H)$ between the high quality output image patch $P'_H$ and the high quality input image patch $P_H$.

The first neural network model and the second neural network model are the same neural network model. That the first neural network model and the second neural network model are the same may mean that the structures and weights of the two network models are the same. That the first neural network model and the second neural network model are the same may mean that the two neural network models are a single neural network model. The first neural network model and the second neural network model may each be a Siamese convolutional neural subnetwork. The first neural network model and the second neural network model may be stored in the memory 810. Because the two models are the same, the two models may not be redundantly stored and thus may be stored once.

The loss function may have, as the terms, the difference $D(P'_L, P_H)$ between the low quality output image patch and the high quality input image patch, and the product $D(P'_L, P_L)*D(P'_H, P_H)$ of the difference between the low quality output image patch and the low quality input image patch and the difference between the high quality output image patch and the high quality input image patch. In this case, each term may be multiplied by a proportional constant.

The gradient of the loss function for error back-propagation may not include partial differential of the difference $D(P'_L, P_L)$ between the low quality output image patch and the low quality input image patch. The gradient of the loss function means the gradient for each weight, and the partial differential means the partial differential for each weight. The gradient of the loss function may include the partial differential of the difference $D(P'_L, P_H)$ between the low quality output image patch and the high quality input image patch and the partial differential of the difference $D(P'_H, P_H)$ between the high quality output image patch and the high quality input image patch.

The loss function may include an L1 difference between the low quality output image patch and the high quality input image patch, the product of an L1 difference between the low quality output image patch and the low quality input image patch and an L1 difference between the high quality output image patch and the high quality input image patch, a VGG difference between the low quality output image patch and the high quality input image patch, and the product of a VGG difference between the low quality output image patch and the low quality input image patch and a VGG difference between the high quality output image patch and the high quality input image patch. Each of these may be each term of the loss function, and each term may be multiplied by a proportional constant. For example, the product of the VGG difference between the low quality output image patch and the low quality input image patch and the VGG difference between the high quality output image patch and the high quality input image patch may be multiplied by a constant w=0.001.

The first neural network model may use nested convolution kernels. The first neural network model may have a U-Net structure. In the encoding part of the first neural network model, for the convolution kernels other than a first convolution kernel, each convolution kernel may include each convolution kernel smaller than itself and is included in each convolution kernel larger than itself.

The low quality input image patch and the high quality input image patch may be captured by the same image capture device, based on different quality settings, i.e., different capture parameters. The low quality input image patch may be captured with high sensitivity and short exposure time, and the high quality input image patch may be captured with low sensitivity and long exposure time. In this case, the capture parameters may be set such that the brightness of the low quality image is equal to the brightness of the high quality image.

FIG. 11 is a flowchart schematically illustrating a method of operating a data set collection apparatus for enhancing image detail, according to an embodiment of the disclosure.

Referring to FIG. 11, in operation S1110, the processor 920 of the data set collection apparatus 900 may capture a first quality image through the image capture module 930 based on a first capture parameter. In operation S1120, upon the first quality image being captured, the processor 920 of the data set collection apparatus 900 may automatically capture a second quality image through the image capture module 930 based on a second capture parameter. In this case, the first capture parameter and the second capture parameter are different parameters. For example, the second capture parameter may include lower sensitivity and longer exposure time than those of the first capture parameter. The first quality image and the second quality image may be captured sequentially at a short time interval. The first quality image and the second quality image may be captured through adjacent lenses at the same time.

In operation S1130, the processor 920 may transmit the first quality image and the second quality image to the neural network model training apparatus 800 for enhancing image detail. When the data set collection apparatus 900 and the neural network model training apparatus 800 are a single apparatus, this may be data transmission inside the apparatus.

The data set collection apparatus 900 may convert a captured image into an image with redrawn details. That is, the processor 920 of the data set collection apparatus 900 may receive the neural network model from the neural network model training apparatus 800, capture an image for enhancing details, and obtain an image with redrawn details by inputting the captured image to the neural network model. Receiving the neural network model may be receiving the weights of the neural network model. Receiving the neural network model may be receiving the structure and weights of the neural network model. The received neural network model may be stored in the memory 910.

The disclosure may be applied in many fields that require image processing as follows:

- Processing of photos using a special application. The end user may independently collect a personal training database for adapted image processing. (Therefore, when enhancement of portrait photos is desired, the user may gather an array of training data including many portraits, and when enhancement of photos of animals or plants is desired, the user may independently gather an array of training data including many animals or landscapes, respectively. In addition, any known collected arrays of training data may also be used);
- Photo beautification. For example, by gathering an array of training data including beautiful faces (e.g., with makeup, without "flaws", etc.), a convolutional neural network may be trained to apply a "beauty" effect to face images;
- Security camera image enhancement. For example, enhancement of the image of a car number or face of a criminal, etc.;
- Virtual reality image enhancement;
- Text image enhancement for OCR; and
- Detection of similar objects in images.

Embodiments of the disclosure may be implemented as computer-executable code on a computer-readable recording medium. The computer-readable recording medium includes any recording medium such as magnetic medium, optical medium, read-only memory (ROM), random access memory (RAM), and the like. The computer-readable recording medium may be provided in the form of a non-transitory storage medium. The "non-transitory storage medium" refers to a tangible device and means that it does not include a signal (for example, electromagnetic wave). This term does not distinguish between a case in which data is stored semi-permanently in a storage medium and a case in which data is stored temporarily in a storage medium. For example, the "non-transitory storage medium" may include a buffer that temporarily stores data.

According to an embodiment of the disclosure, methods according to various embodiments of the disclosure may be provided in a state of being included in a computer program product. The computer program product may be traded between a seller and a buyer as a product. The computer program product may be distributed in a state of being stored in a computer-readable recording medium or may be distributed through an application store (e.g., Play Store™) or two user devices (e.g., smartphones) directly or online (e.g., downloaded or uploaded). In case of online distribution, at least part of the computer program product (e.g., downloadable app) may be at least temporarily stored in a computer-readable recording medium, such as a memory of a manufacturer's server, an application store's server, or a relay server, or may be temporarily generated.

According to an embodiment of the disclosure, a method and apparatus for training a neural network model for enhancing image detail may be provided. An image with fine details restored and redrawn in a natural way may be obtained while preserving integrity of long-range objects having the self-similarity property. In addition, due to a very small amount of weights, the convolutional neural network model according to the disclosure requires a small storage capacity.

The disclosure has been described in detail with reference to embodiments of the disclosure illustrated in the drawings. These embodiments of the disclosure are not intended to limit the disclosure, but to be illustrative only, and should be considered from an explanatory point of view rather than a limiting point of view. Those of ordinary skill in the art will appreciate that these embodiments of the disclosure may be easily modified into other specific forms without changing the technical spirit or essential features of the disclosure. For example, the element described as the single type may be implemented in a distributed manner. Similarly, the elements described as distributed may be implemented in a combined form. Although specific terms are used in the specification, they are used only for the purpose of describing the concept of the disclosure and are not used to limit the scope of the disclosure as defined in the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A neural network model training apparatus for enhancing image detail, the neural network model training apparatus comprising:
   a memory configured to store one or more instructions; and
   at least one processor configured to execute the one or more instructions stored in the memory to:
   obtain a low quality input image patch and a high quality input image patch;
   obtain a low quality output image patch by inputting the low quality input image patch to a first neural network model;
   obtain a high quality output image patch by inputting the high quality input image patch to a second neural network model; and
   train the first neural network model based on a loss function set to reduce a difference between the low quality output image patch and the high quality input image patch, and a difference between the high quality output image patch and the high quality input image patch,
   wherein the second neural network model is identical to the first neural network model.

2. The neural network model training apparatus of claim 1, wherein the loss function includes as terms:
   the difference between the low quality output image patch and the high quality input image patch, and
   a product of a difference between the low quality output image patch and the low quality input image patch, and the difference between the high quality output image patch and the high quality input image patch.

3. The neural network model training apparatus of claim 2, wherein, when the at least one processor trains the first neural network model, a gradient of the loss function for error back-propagation does not include a partial differential of the difference between the low quality output image patch and the low quality input image patch.

4. The neural network model training apparatus of claim 1, wherein the loss function includes:
   an L1 difference between the low quality output image patch and the high quality input image patch,
   a product of an L1 difference between the low quality output image patch and the low quality input image patch, and an L1 difference between the high quality output image patch and the high quality input image patch,
   a visual geometry group (VGG) difference between the low quality output image patch and the high quality input image patch, and
   a product of a VGG difference between the low quality output image patch and the low quality input image patch, and a VGG difference between the high quality output image patch and the high quality input image patch.

5. The neural network model training apparatus of claim 1, wherein the first neural network model uses nested convolution kernels.

6. The neural network model training apparatus of claim 1, wherein, in an encoding part of the first neural network model, for convolution kernels other than a first convolution kernel, each convolution kernel includes each convolution kernel smaller than itself and is included in each convolution kernel larger than itself.

7. The neural network model training apparatus of claim 1, wherein the low quality input image patch and the high quality input image patch are captured by a same image capture device, based on different capture parameters.

8. The neural network model training apparatus of claim 1,
   wherein the low quality input image patch is captured with higher sensitivity and shorter exposure time than the high quality input image patch, and
   wherein the high quality input image patch is captured with lower sensitivity and longer exposure time than the low quality input image patch.

9. A method of a neural network model training for enhancing image detail, the method comprising:
   obtaining a low quality input image patch and a high quality input image patch;
   obtaining a low quality output image patch by inputting the low quality input image patch to a first neural network model;
   obtaining a high quality output image patch by inputting the high quality input image patch to a second neural network model; and
   training the first neural network model based on a loss function set to reduce a difference between the low quality output image patch and the high quality input image patch, and a difference between the high quality output image patch and the high quality input image patch,
   wherein the second neural network model is identical to the first neural network model.

10. The method of claim 9, wherein the loss function includes, as terms:
    the difference between the low quality output image patch and the high quality input image patch, and
    a product of a difference between the low quality output image patch and the low quality input image patch, and the difference between the high quality output image patch and the high quality input image patch.

11. The method of claim 10, wherein a gradient of the loss function for error back-propagation does not include a partial differential of the difference between the low quality output image patch and the low quality input image patch.

12. The method of claim 9, wherein the loss function includes:
    an L1 difference between the low quality output image patch and the high quality input image patch,
    a product of an L1 difference between the low quality output image patch and the low quality input image patch, and an L1 difference between the high quality output image patch and the high quality input image patch,
    a visual geometry group (VGG) difference between the low quality output image patch and the high quality input image patch, and
    a product of a VGG difference between the low quality output image patch and the low quality input image patch, and a VGG difference between the high quality output image patch and the high quality input image patch.

13. The method of claim 9, wherein the first neural network model uses nested convolution kernels.

14. The method of claim 9, wherein the low quality input image patch and the high quality input image patch are captured by a same image capture device, based on different capture parameters.

15. A non-transitory computer-readable recording medium having recorded thereon a program for performing, by a computer, the method of claim 9.

* * * * *